(No Model.)
A. CONKLING.
CLOCK CASE.
No. 584,923. Patented June 22, 1897.
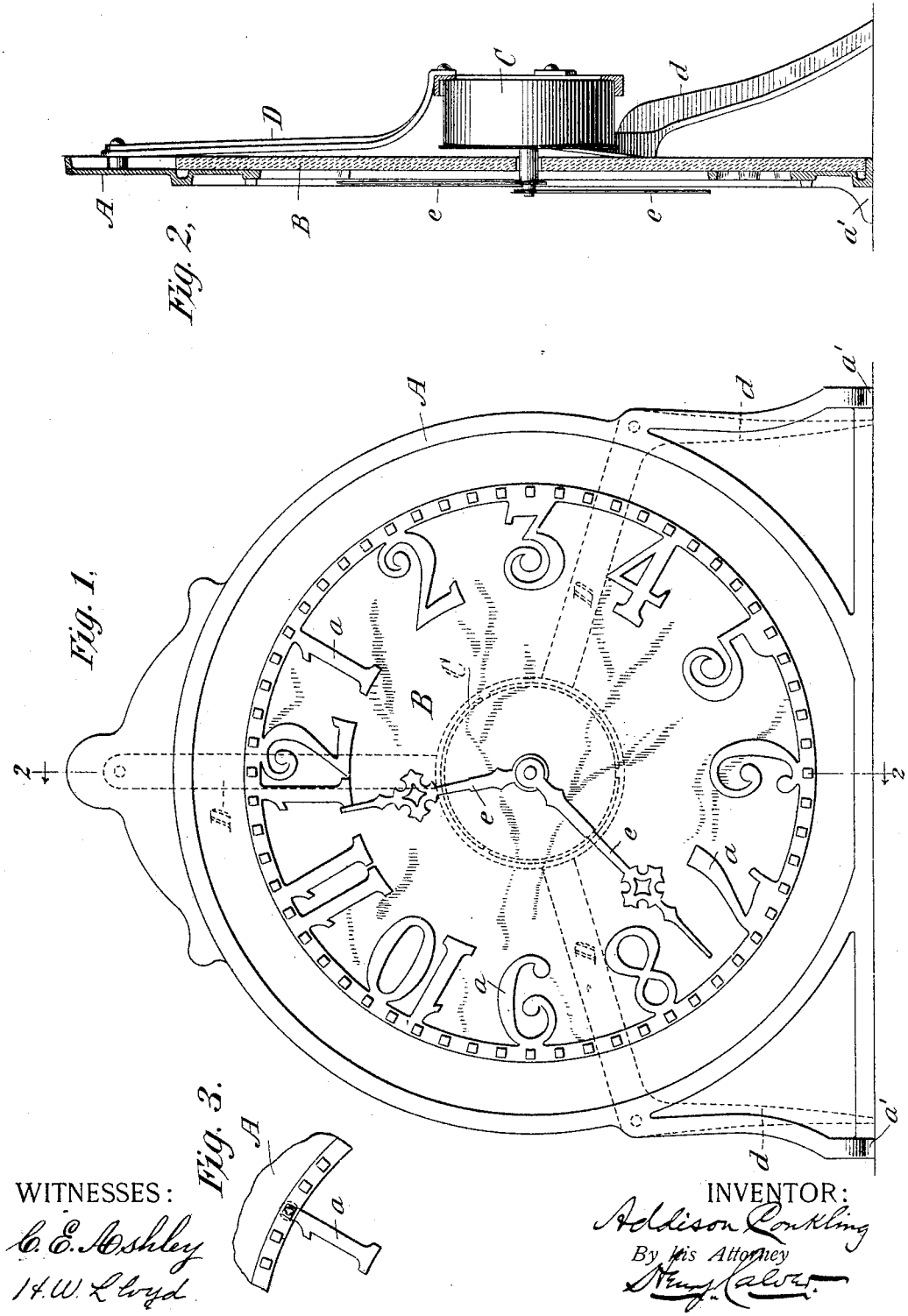
WITNESSES:
C. E. Ashley
H. W. Lloyd
INVENTOR:
Addison Conkling
By his Attorney
Henry Calver
THE NORRIS PETERS CO., PHOTO-LITHO., WASHINGTON, D. C.

UNITED STATES PATENT OFFICE.

ADDISON CONKLING, OF PLAINFIELD, NEW JERSEY.

CLOCK-CASE.

SPECIFICATION forming part of Letters Patent No. 584,923, dated June 22, 1897.

Application filed August 10, 1895. Serial No. 558,886. (No model.)

*To all whom it may concern:*

Be it known that I, ADDISON CONKLING, a citizen of the United States, residing at Plainfield, in the county of Union and State of New Jersey, have invented certain new and useful Improvements in Clocks, of which the following is a specification, reference being had therein to the accompanying drawings.

My invention has for its object to provide clocks which will be handsome and elegant in appearance, so as to give the rich effects of expensive clocks, but which may be produced at comparatively little cost, so that they will be within the means of persons of moderate circumstances or may be utilized in offices and other places where ordinary cheap clocks have heretofore been used.

In carrying my invention into effect I provide a front-face casing having an open center, into which extends from said casing the skeleton numerals or characters constituting the clock-dial, said numerals or characters being made as part of said casing by being cast or otherwise formed integral therewith or attached thereto, preferably the former. Behind the dial-characters and inclosed by the casing A is placed a backing-plate having a front face contrasting with the color of said characters, so as to bring the latter out in strong relief, this backing-plate being preferably of marbleized slate, which, while it may be provided at little cost, will have a very handsomely-finished surface, giving the effect of rich marble, onyx, or even more expensive stones. Rearward of this backing-plate is placed the clock-movement, which will preferably be a small and inexpensive one, inclosed in a sheet-metal case attached to the front-face casing by arms constituting a spider, the two lower arms of the latter having depending portions forming legs or braces to steady the whole structure, so that it will stand steadily upright. The central arbors of the clock-movement carrying the index-hands extend from said movement forward through the backing-plate to receive said hands in front of the clock-face, as usual.

In the accompanying drawings, Figure 1 is a front view of a clock embodying my invention. Fig. 2 is a vertical section of the same on line 2 2, Fig. 1. Fig. 3 is a detail illustrating a slight modification.

A denotes the front-face casing, which will preferably be of cast-iron, and which will have a large central opening into which the skeleton hour-indicating characters or numerals $a$, constituting the dial, extend from said casing, said numerals being preferably cast integral with said casing, as shown in Figs. 1 and 2; but they may be formed separately from said casing and be attached thereto by rivets or screws, as indicated by Fig. 3.

The casing A is preferably provided in front at its lower edge with small lugs $a'$, constituting feet to steady the clock and prevent it from falling over forward.

For simplicity of illustration the casing A is herein shown as being plain; but it will be understood that it may be of any desirable ornamental form or finish either in solid or skeleton work.

B denotes the backing-plate, which is inclosed by backwardly-turned flanges at the edges of the casing A, and which plate covers the central opening in the said casing, said backing-plate being contiguous or closely adjacent to said casing and being somewhat larger in diameter than the said opening, and having, as hereinbefore stated, a handsome front surface finish of such color as will make the dial characters or numerals stand out strongly in contrast thereto.

The backing-plate B is a continuous one in the sense that it is not of open-work or skeleton form, and it therefore presents a continuous contrasting surface rearward of the skeleton hour-indicating characters or numerals.

Rearward of the backing-plate B is the clock-movement, inclosed in a sheet-metal case C, attached to the cast-iron front casing A by spider-arms D, the two lowermost of which have depending portions $d$, forming legs or braces to steady the clock and prevent it from falling over backward.

The backing-plate B is preferably held in place in a suitable recess in the rear of the front casing A by the said arms D, said plate being interposed between said arms and casing. The central arbors $c$ of the clock-movement, carrying the index hands $a$, extend forward through an opening in the backing-plate B.

The iron front-face casing A, together with the numerals forming part thereof, may have any desirable surface finish, and the front surface finish of the backing-plate B, covering the central opening in said casing, will be of such color as to contrast strongly with the color of the numerals, and will also preferably be in simulation of some rich stone, so that the clock, although produced so cheaply that it may be sold at a very low price, will really have the rich and elegant appearance of a handsome and expensive clock such as persons of moderate means cannot usually afford.

Although I have shown the front casing A as having a central opening, which is entirely unobstructed except as to the space occupied by the numerals $a$, extending inward radially into said opening, it will be understood that said opening might be partly occupied with ornamental skeleton work, if desired, so long as such skeleton work does not obscure the handsome front surface of the contrasting backing-plate B.

Having thus described my invention, I claim and desire to secure by Letters Patent—

1. In a clock, the combination with a front-face casing provided with backwardly-turned flanges and having a central opening, and having also skeleton dial-characters forming a part of said casing and extending into said opening, of a continuous backing-plate inclosed by said flanges and placed contiguous or closely adjacent to said casing and covering said opening, said backing-plate having a front finish to contrast strongly with said characters, and a clock-movement rearward of said backing-plate and having arbors extending through said plate, and carrying suitable index-hands in front.

2. The combination with the cast-metal front casing A having a central opening, of the dial-characters $a$ supported by said casing and extending radially into said opening, the backing-plate B covering said opening, and having a front finish to contrast strongly with said characters, a clock-movement provided with suitable index-hands, and the spider-arms D connecting said movement with the said casing, two of said arms having the depending legs or braces $d$.

In testimony whereof I affix my signature in presence of two witnesses.

ADDISON CONKLING.

Witnesses:
HENRY CALVER,
JAMES T. LAW.